INVENTOR.
W. DIETRICH
BY Robert Harding Jr.
ATTORNEY

INVENTOR.
W. DIETRICH
BY Robert Harding Jr.
ATTORNEY

June 9, 1964 W. DIETRICH 3,136,976

METHOD FOR THE AUTOMATIC RECOGNITION OF CHARACTERS, IN PARTICULAR WRITING CHARACTERS (FIGURES, LETTERS, AND THE LIKE)

Filed May 29, 1959 6 Sheets-Sheet 3

INVENTOR.
W. DIETRICH
BY Robert Harding Jr
ATTORNEY

INVENTOR.
W. DIETRICH
BY Robert Harding Jr.
ATTORNEY

INVENTOR.
W. DIETRICH
BY Robert T. Harding Jr.
ATTORNEY

June 9, 1964 W. DIETRICH 3,136,976

METHOD FOR THE AUTOMATIC RECOGNITION OF CHARACTERS, IN PARTICULAR WRITING CHARACTERS (FIGURES, LETTERS, AND THE LIKE)

Filed May 29, 1959 6 Sheets-Sheet 6

INVENTOR.
WALTER DIETRICH

BY Robert Lieber

ATTORNEY

United States Patent Office
3,136,976
Patented June 9, 1964

3,136,976

METHOD FOR THE AUTOMATIC RECOGNITION OF CHARACTERS, IN PARTICULAR WRITING CHARACTERS (FIGURES, LETTERS, AND THE LIKE)

Walter Dietrich, Ditzingen, Leonberg, Germany, assignor to International Standard Electric Corporation, New York, N.Y., a corporation of Delaware Filed May 29, 1959, Ser. No. 816,791
Claims priority, application Germany June 6, 1958
12 Claims. (Cl. 340—146.3)

Figure 1:
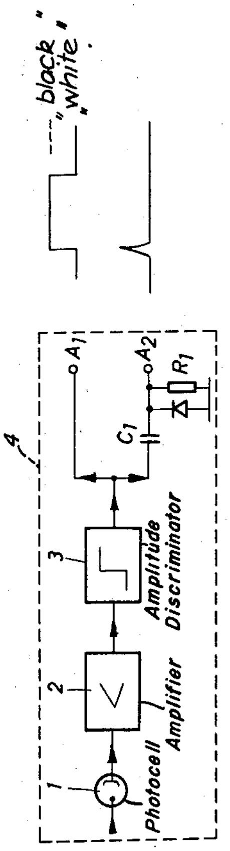

The present invention relates to a method for the automatic recognition of characters, in particular writing characters such as figures, letters, and the like.

For the automatization of computing processes or the like it is desirable for visually readable characters to be directly and automatically read, in order to control thereby corresponding equipments, e.g., in data-processing systems. This wish has released a great number of proposals relating to automatic reading of letters and figures.

The conventional methods relating to the automatic recognition of writing characters mainly operate in accordance with the principle of scanning predetermined points or portions of the characters either photoelectrically, magnetically or electrically.

In some of these conventional methods the characters are scanned along predetermined horizontal and/or vertical lines in a photoelectrical manner, in the course of which the respective black or white portions are determined. With a suitable selection of scanning lines criteria for the individual characters will result upon which a predetermined code may be based. However, this code is completely arbitrary and, therefore, as a rule also hard to follow up. It is of a particular disadvantage that only a few criteria are available and that therefore the evaluation is very sensitive or susceptible to variations regarding the line thickness and the print.

Instead of the optical scanning technic it has also been proposed to print the characters with an electrically conductive or magnetic ink, or the like, and to carry out the scanning along predetermined lines with the aid of corresponding sensing devices.

Another method of conventional scanning consists in determining the contents of black within the type field. Under certain circumstances, however, this results in criteria which are difficult to distinguish from each other. One of the oldest known methods for the recognition of characters operates with reference characters, which as a rule requires rather expensive means.

Furthermore it has been suggested to make use of the sudden variations in the line curves of the characters. In this method, however, a slight faulty discontinuity or interruption in the line curve of the characters is noticed very disturbingly; again because only a few criteria are available. In order to avoid faulty evaluations very complicated methods are required for determining whether or not the interruption of the line is due to the character itself.

Furthermore, character recognition methods have already become known in which the characters are scanned in a different way, e.g. by being imaged on a photocell raster. Each of the employed photocells is assigned to a particular partial area of the character field. Depending upon the black contents of the respective partial area the photocells will release either a readable output signal or a negligible one. In corresponding coincidence circuits these output signals are assigned to the respective character. These methods, which at first appear to be very simple, bear the disadvantage that the characters are quantized by the rastering process, in other words, that they are coarsened. On account of this it is then very likely that small variations in the structure of the characters can easily be the cause of trouble or disturbances and, consequently, of faulty evaluations; in some cases the evaluation may even be rendered impossible.

Another method provides for the scanning of the characters along predetermined scanning tracks, and the measuring of the length of the black portions on the respective tracks. This method, however, is strongly dependent upon the thickness of the lines.

By a similar method it is proposed to guide a light spot, similar to television scanning, on a plurality of tracks over the character. The trains of pulses produced by the black-white transitions, are identified by special equipment, and are assigned to the characters. Again in this case a quantized scanning with its associated complicated identification equipment is necessary. Finally, the recognizing methods in which the characters are correspondingly deformed for the recognizing purpose, or in which additional features are assigned thereto should be mentioned. However, these methods are too far removed from the idea on which the present invention is based.

The present invention is based on the underlying idea of seizing during the scanning operation, the analogous shape of the non-deformed characters, for avoiding the disadvantages appearing with the conventional types of methods, and of placing the digitalization, which is necessary for the evaluation in logic circuits, as far back as possible in the process.

The general idea of the invention consists: in that the characters are scanned along several tracks; in that pulses are obtained in the case of brightness leaps; in that—directly and in a definite assignment to the scanning tracks—the succession of the pulses which respect to time, due to the analogous shape of the characters, is determined with reference to other tracks; in that the pulses of respectively two or more scanning tracks are adapted to control a bistable stage; and/or in that the number of the pulses for each particular scanning track is determined; in that the pulses of one scanning track are fed to and stored in a further bistable stage, and finally in that, after the scanning of the character, the combinations of the electrical conditions of the bistable stages pertaining or assigned to the character, are used for recognizing the characters via logical circuits of the type known per se.

The general conception is independent of the means of scanning employed, but a photoelectric scanning with the aid of a row of photocells extending from above to below, is regarded as most appropriate, because in this case no dependency upon a special preparation of the characters exists. The number of employed photocells depends on the given requirements, in other words, it depends upon how far the character is to be resolved.

The output signals of the photocell, produced in the case of brightness variations, can be converted into pulses in the conventional manner with the aid of amplifiers.

amplitude limiters and differentiation circuits. The connection between the photocells and the bistable stages can be carried out in many ways, e.g. depending on the employed types of characters.

One practical possibility may be seen, e.g., in that for each scanning track one bistable stage is employed for the counting of the pulses (hereinafter referred to as the counting stage), this bistable stage is controlled in a binary fashion by one photocell, changing its electrical condition each time upon reception of a pulse; and a further bistable stage is employed for the seizure of the time succession of pulses (hereinafter referred to as the time-succession stage), this bistable stage is controlled by two photocells.

The controlling of the time-succession stages may be carried out in various ways; thus it is possible that they can be brought by the first photocell into one, and by the second photocell to the other bistable condition; in other words, they are controlled in a directional manner. The two photocells controlling a time succession stage may be directly adjacent, or may be one or several photocells, (scanning tracks) apart. Another possibility resides in choosing the coupling in such a way that the first photocell will cause a change of state upon each reception of a pulse, while the second photocell is only effective in one direction. Furthermore, it is possible with the time-succession stages to utilize the white-black as well as the black-white leaps. Finally, it is also possible to couple, to a number of time-succession stages further time-succession stages which are controlled by the first mentioned stages in one of the described manners.

In each of the above possibilities a very particular combination of conditions of the individual bistable stages will result for each character. These conditions may then be used for the recognizing purpose via conventional types of logic circuits.

Figure 2:
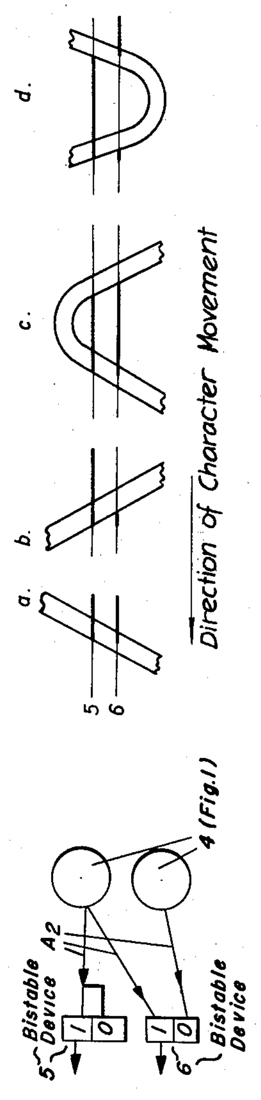
Figure 3:
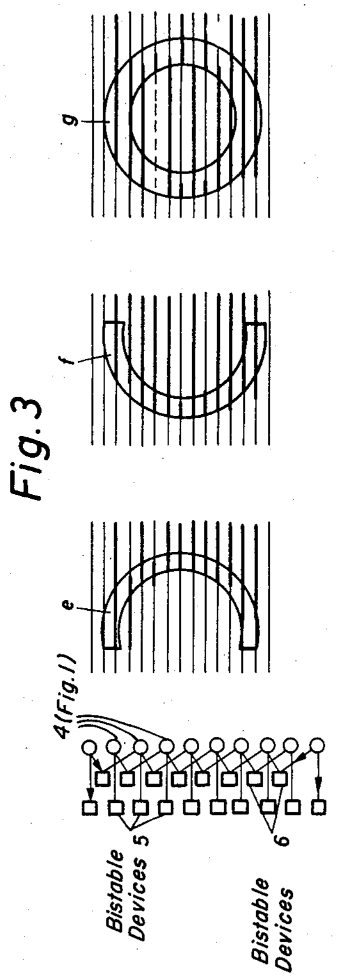
Figure 4:
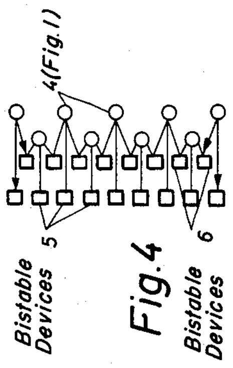
Figures 5, 6:
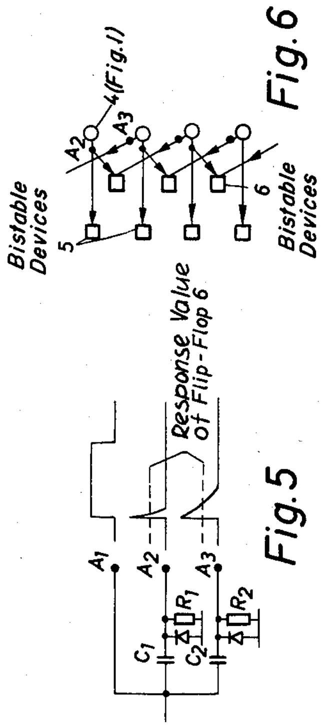
Figure 7A:
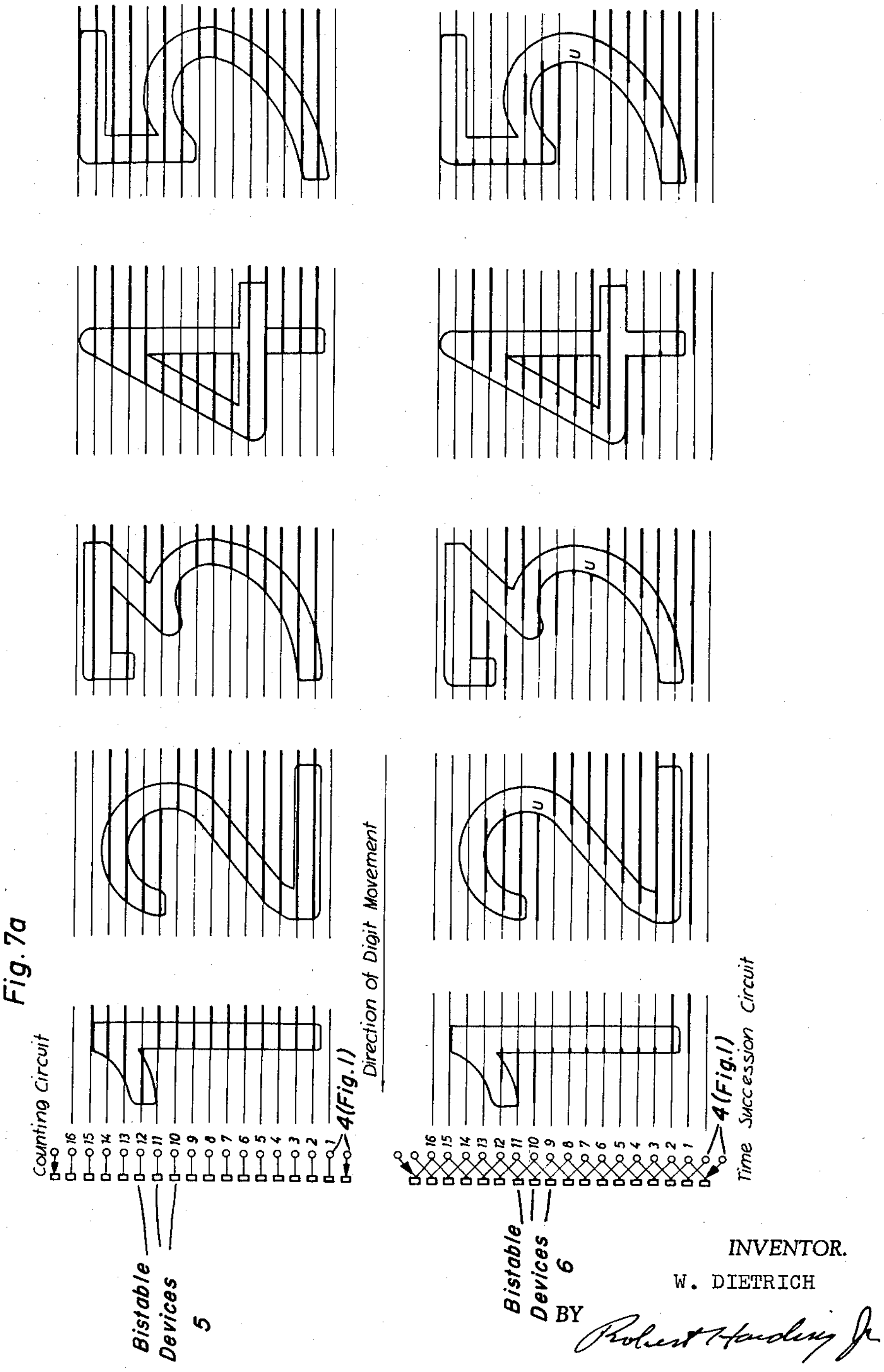
Figure 7B:
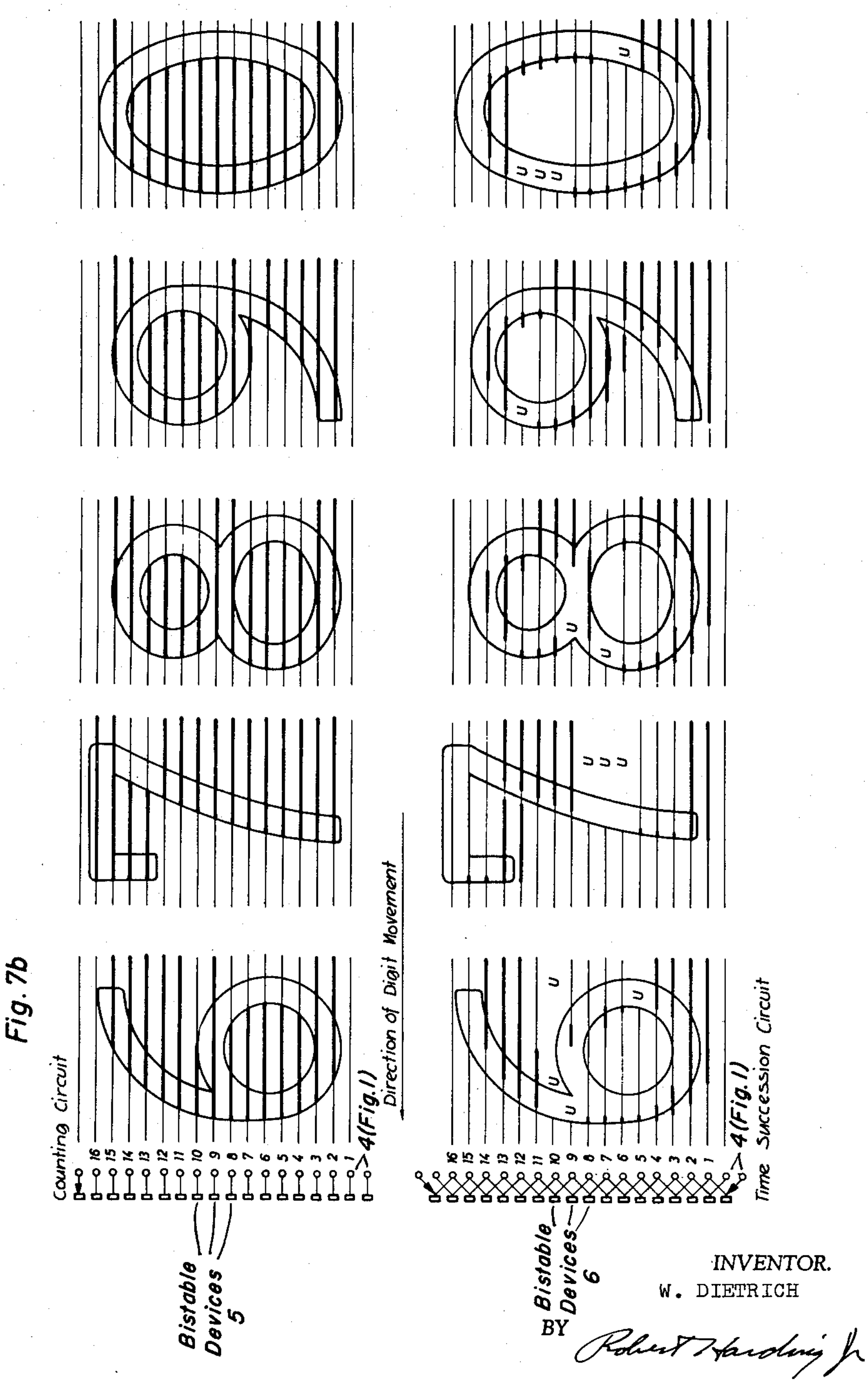
Figure 8:
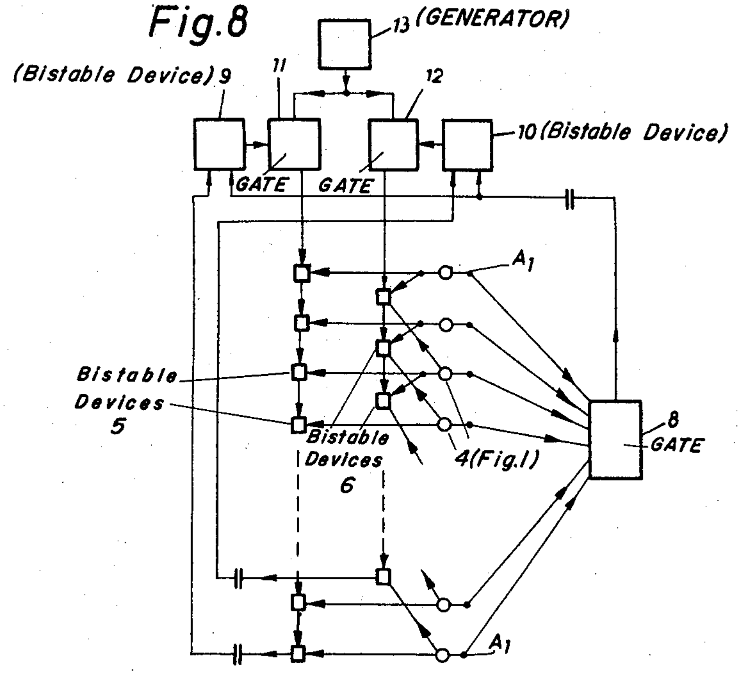
Figure 9:
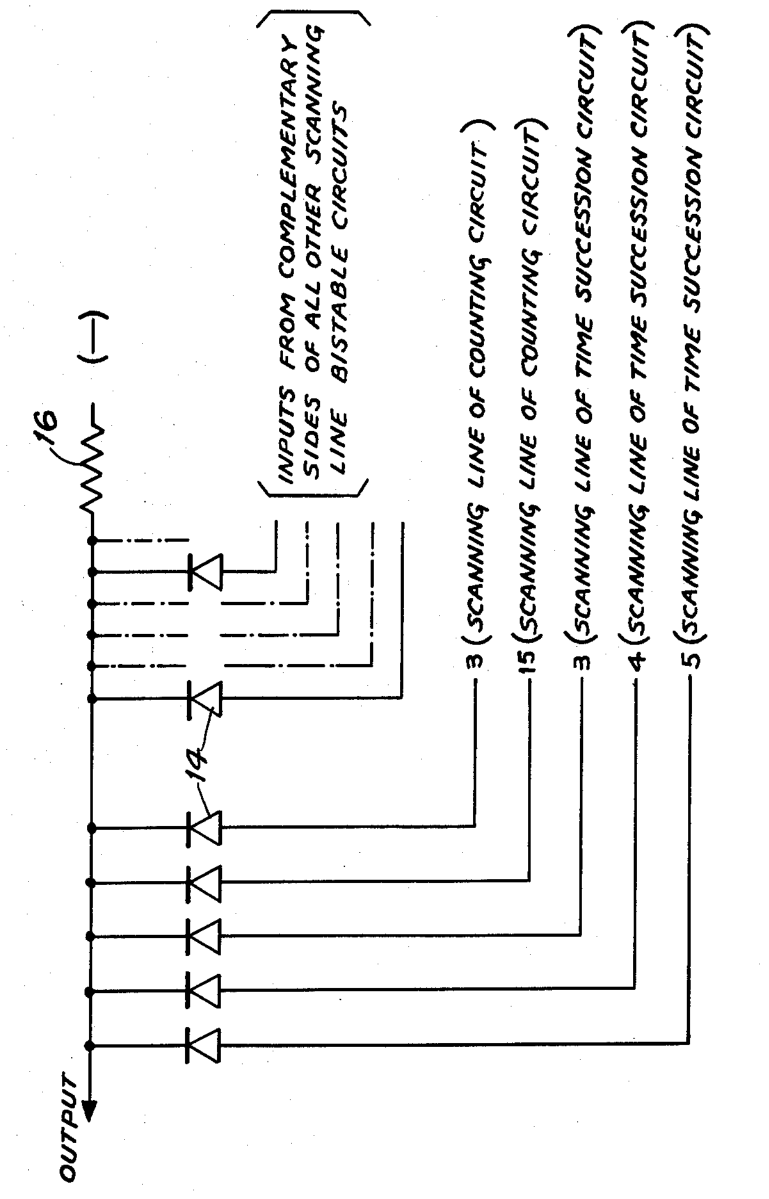

The invention, as well as further features and advantages thereof, will now be described in detail with reference to the embodiments shown in FIGS. 1–9 of the accompanying drawings, in which:

FIG. 1 shows a scanning photocell with the subsequently arranged parts of the circuit for producing the scanning pulses, FIG. 2 shows a recognizing circuit for carrying out the method according to the invention, with the bistable stages being in their normal conditions, FIG. 3 shows another type of recognizing circuit also lying within the scope of the invention, and showing the bistable stages in their normal conditions, FIG. 4 shows a further modified arrangement for the recognition of characters according to the invention, FIGS. 5 and 6 show circuit arrangements for seizing vertical contours, FIGS. 7*a* and 7*b* show the practical application of the recognizing circuit according to FIG. 6 for the 10 digits 0 . . . 9, FIG. 8 shows a circuit arrangement for centering the characters with respect to the scanning photocells; and FIGURE 9 illustrates details of an exemplary coincidence circuit and inputs thereto, the output of which circuit is distinctively marked only upon scanning of the character "0."

The signals which are produced by the scanning of the photocell 1 (FIG. 1) are amplified in the conventional manner by the amplifier 2. It is appropriate to employ crystalphoto diodes with transistor amplifiers. The amplifier may be designed either as a direct-current amplifier or as an alternating-current amplifier with a clamping diode.

The amplifier 2 is followed by an amplitude discriminator 3, e.g., a trigger, adapted to digitalize the scanned signals for providing the statement "black" or "white." The amplitude discriminator 3 is provided with two outputs, namely a direct-current output A1 for the centering as described hereinafter, and an output A2 for the recognition. At the output A2 a positive pulse is produced each time that the direct-current voltage at A1 becomes positive, that is, in the case of the assumed polarity, when the black edge of a character reaches the photocell.

In FIG. 2 two photocells with two subsequently arranged flip-flop circuits are shown. This arrangement can be used for carrying out the method according to the invention. The photocells including the amplifiers, amplitude threshold and the output A2 are indicated by the circle 4, and the flip-flop stages are indicated by the squares 5 and 6. The flip-flop stage 5 is connected with one of the photocells, 4, and the flip-flop stage 6 is connected with both photocells, 4. The first flip-flop circuit is so designed that it is triggered from one to the other rest position by each incoming pulse. In this way a criterion will be obtained as to whether an even or odd number of pulses has appeared during the scanning of a character on the scanning track. The second flip-flop circuit is designed in such a way that it will be triggered by the first pulse from the upper photocell into one rest position, and by each pulse from the lower photocell into the other rest position. The flip-flop circuits which are necessary for both cases are of conventional type and, therefore, do not need to be described in particular herein.

FIG. 2 comprises only two photocells since it merely serves to explain the principle of the process according to the invention. It may be completed by adding further photocells such as shown in FIG. 3 for effecting the complete character recognition. By means of these two photocells it is thus possible to scan two tracks. It is assumed that four shape elements which are designated by the letters "*a*" through "*d*" exist. The thin and thick (solid) lines shown to extend transversally in relation to the shape elements, represent the electrical state of the flip-flop circuits, when the shape elements are moved from the right to the left across the photocells. It is assumed that a thin line corresponds to the condition "off," and a thick or solid line to the condition "on" of the respective flip-flop circuit. With respect to both flip-flop circuits it is presupposed that they, prior to the scanning, are in the condition "off." During the sweeping of the character element "*a*" the lower of the photocells, 4, will reach the black edge of this particular character element first. However, a change in condition of the flip-flop circuit 6 is not yet effected, because this flip-flop can only be triggered by this photocell into the condition "off," and because it is assumed to be in this condition at the beginning of the scanning operation. When the upper photocell 4 reaches the black edge of the character element, the flip-flop circuit 6 will be triggered into the condition "on"; at the same time, however, the flip-flop circuit 5 is reversed by this photocell into the condition "on." At the end of the scanning of the shape element "*a*" both flip-flop circuits will thus have assumed the condition "on," which is indicated by the solid line. During the scanning of the shape elements *b*–*d* the same processes are effected. The respective final conditions of the flip-flop circuits can be distinguished in this case by the different kinds of lines. Accordingly, it is possible to distinguish four different shape elements with the aid of two flip-flop circuits.

As a rule, the recognition of four shape elements by employing only two photocells is insufficient for the scanning of characters, so that several photocells, that is, scanning tracks, have to be provided.

In FIG. 3 there is shown a row of photocells 4.

Each of the photocells is connected to a flip-flop circuit 5. The flip-flop circuits 6 are each controlled by two photocells, not directly adjacent. Between these two photocells there is arranged another photocell adapted to control another flip-flop circuit 6. This coupling of the photocells to the flip-flop circuits is appropriate whenever the characters have a disturbed microstructure. The controlling of the flip-flop circuits is effected as in the aforementioned FIG. 2, i.e., the flip-flop stages 5 are controlled in a binary manner, and the flip-flop circuits 6 in a directed manner. During the scanning of the shape elements "*e*" through "*g*" as shown in FIG. 3 the electrical conditions of the flip-flop circuits 5 and 6 will result as indicated by the different kinds of lines (thin and solid).

The vertical straight line represents an important shape element which is indicated reliably by the flip-flop circuit 5, but not reliably by the flip-flop circuits 6. This is because the two photocells controlling one flip-flop circuit 6 are reached by the black edge of the straight line either simultaneously or in an undefined order of succession. The latter may easily occur during normal operation. Several possibilities exist for the unambiguous indication of the vertical shape element by the flip-flop circuit 6.

For example, the row of photocells may be arranged in a somewhat inclined manner. In this case, however, another shape element, extending in parallel with this row of photocells will not be recognized reliably. Nevertheless, it is easily possible to find an inclination of the row of photocells which has no particular importance to the recognition of figures. Another possibility resides in arranging the row of photocells in a zig-zag manner as shown in FIG. 4.

Finally, it is possible to leave the photocells in the arrangement as shown in FIG. 3, but to ensure the unambiguous recognition of a vertical shape element by providing a corresponding circuit arrangement. A corresponding example is shown in FIG. 5. According to this example a third output, A3, is provided in addition to the circuit arrangement shown in FIG. 1, and it is assumed that $C2 \text{ x } R2 > C1 \text{ x } R1$. The coupling of the outputs A2 and A3 to the flip-flop circuits 5 and 6 is schematically shown in FIG. 6. Because of dimensioning of the R-C circuits the pulses appearing at the output A3 are longer than those appearing at the output A2, so that in the case of a simultaneous commencement of the two output pulses, i.e., in the case of a vertical shape element, the pulse of A3 will be effective longer, thus unambiguously controlling the coupled flip-flop circuit 6 and causing it to assume the position "off." In this case the vertical shape element is indicated like the shape element "b" as shown in FIG. 2.

In FIGS. 7*a* and 7*b* the practical application of the process with respect to the recognition of the ten digits 0 . . . 9 is shown. In this representation it is assumed that the vertical contours are recognized in accordance with what has been mentioned in connection with FIGS. 5 and 6.

For the flip-flop circuits of the counting circuit are separated from the flip-flop circuits of the time-succession circuit. Both kinds of the flip-flop circuits are controlled by the same photocell, thus the row of photocells in FIG. 7, top and bottom, are the same cells. The lines again indicate what position the flip-flop circuits assume as the digits are moved past the photocells. On the right-hand side of the digit the final condition subsequent to the scanning appears. The lines, provided at their end with a small *u*, indicate an unreliable final position of the flip-flops; these tracks are not being used and are not required for the recognition of the figures. Some of the flip-flops assume an unreliable position at the front edge of the character, e.g., in the case of the digit "8"; by the further contours of the character however their position will again become unambiguous, so that these tracks may be used for the recognition purpose.

It will be seen from FIG. 7 that the process provides sufficient features for distinguishing between the digits. The result is compiled in Tables 1 and 2.

Table 1 shows the final positions of the flip-flops for the ten digits according to FIGS. 7*a* and 7*b*, again in a separated manner according to the counting circuit and the time-succession circuit.

The scanning lines 1 and 2 have been omitted in the table, because they are not used for the recognition purpose, but only for the centering purpose.

*Table 1*

Notation:
0=Final position of Flip-Flop "Off" (thin line)
1=Final position of Flip-Flop "On" (solid line)
—=Final position of Flip-Flop unreliable (5)

| Counting Circuit Scanning Line | Digits | | | | | | | | | |
|---|---|---|---|---|---|---|---|---|---|---|
| | 1 | 2 | 3 | 4 | 5 | 6 | 7 | 8 | 9 | 0 |
| 3 | 1 | 1 | 1 | 1 | 1 | 1 | 1 | 1 | 1 | 1 |
| 4 | 1 | 1 | 1 | 1 | 1 | 0 | 1 | 0 | 1 | 0 |
| 5 | 1 | 1 | 1 | 1 | 1 | 0 | 1 | 0 | 1 | 0 |
| 6 | 1 | 1 | 1 | 1 | 1 | 0 | 1 | 0 | 1 | 0 |
| 7 | 1 | 1 | 1 | 0 | 1 | 0 | 1 | 0 | 0 | 0 |
| 8 | 1 | 1 | 1 | 0 | 1 | 0 | 1 | 1 | 1 | 0 |
| 9 | 1 | 1 | 1 | 0 | 1 | 1 | 1 | 1 | 0 | 0 |
| 10 | 1 | 1 | 0 | 0 | 0 | 0 | 1 | 0 | 0 | 0 |
| 11 | 1 | 0 | 1 | 0 | 1 | 1 | 1 | 0 | 0 | 0 |
| 12 | 0 | 0 | 1 | 1 | 0 | 1 | 1 | 0 | 0 | 0 |
| 13 | 1 | 1 | 0 | 1 | 1 | 1 | 0 | 0 | 0 | 0 |
| 14 | 1 | 1 | 1 | 1 | 1 | 1 | 0 | 1 | 1 | 0 |
| 15 | 1 | 0 | 1 | 1 | 1 | 1 | 1 | 1 | 1 | 1 |
| 16 | 0 | 0 | 0 | 0 | 1 | 0 | 1 | 0 | 0 | 0 |

| Time Succession Circuit Scanning Line | Digits | | | | | | | | | |
|---|---|---|---|---|---|---|---|---|---|---|
| | 1 | 2 | 3 | 4 | 5 | 6 | 7 | 8 | 9 | 0 |
| 3 | 0 | 1 | 1 | 0 | 1 | 1 | 0 | 1 | 1 | 1 |
| 4 | 0 | 1 | 1 | 0 | 1 | 1 | 0 | 1 | 1 | 1 |
| 5 | 0 | 1 | 1 | 0 | 1 | — | 0 | 1 | 1 | 1 |
| 6 | 0 | 1 | 1 | 1 | 1 | 0 | — | 0 | 1 | — |
| 7 | 0 | 1 | — | 1 | 1 | 0 | — | 0 | 0 | — |
| 8 | 0 | 1 | 0 | 0 | — | 0 | — | 0 | 0 | 0 |
| 9 | 0 | 1 | 0 | 0 | 0 | 0 | 1 | 1 | 1 | 0 |
| 10 | 0 | — | 0 | 0 | 0 | — | 1 | 1 | 1 | 0 |
| 11 | 0 | 0 | 1 | 0 | 0 | 0 | 1 | 1 | 0 | 0 |
| 12 | 0 | 0 | 1 | 0 | 0 | 1 | 1 | 0 | 0 | 0 |
| 13 | 0 | 0 | 0 | 1 | 0 | 1 | 1 | 0 | 0 | 0 |
| 14 | 0 | 0 | 0 | 1 | 0 | 1 | 0 | 0 | 0 | 0 |
| 15 | 0 | 0 | 0 | 0 | 0 | 0 | 0 | 0 | 0 | 0 |
| 16 | 0 | 0 | 0 | 0 | 0 | 0 | 0 | 0 | 0 | 0 |

Decisive for the reliability of the process is the number of discriminating features between two digits. This number is taken from Table 1 and is compiled in Table 2 with respect to all digits. The first number indicates the number of discriminating features from the counting circuit, while the second number indicates the number of discriminating features from the time-succession circuit. From this it will be seen that the counting circuit alone delivers two discriminating features in the most unfavourable case (digit 1 against digit 2 or 5). Together with the time-succession circuit the number of the discriminating features amounts, in the most unfavourable case, to five (digit 5 against digit 2 or 3). Thus a high recognizing reliability in the case of a soiled or mutilated digit is insured.

*Table 2*

| Digit | 1 | 2 | 3 | 4 | 5 | 6 | 7 | 8 | 9 | 10 |
|---|---|---|---|---|---|---|---|---|---|---|
| 1 | ----- | 2+7 | 3+6 | 6+4 | 2+5 | 7+5 | 4+5 | 7+6 | 5+6 | 10+3 |
| 2 | ----- | ----- | 5+4 | 6+7 | 4+1 | 9+7 | 6+6 | 7+4 | 5+2 | 10+2 |
| 3 | ----- | ----- | ----- | 5+7 | 3+2 | 6+4 | 3+6 | 6+4 | 4+4 | 9+2 |
| 4 | ----- | ----- | ----- | ----- | 6+5 | 5+5 | 8+5 | 7+10 | 3+8 | 6+5 |
| 5 | ----- | ----- | ----- | ----- | ----- | 7+5 | 4+8 | 7+5 | 5+3 | 10+0 |
| 6 | ----- | ----- | ----- | ----- | ----- | ----- | 9+5 | 4+5 | 8+5 | 5+3 |
| 7 | ----- | ----- | ----- | ----- | ----- | ----- | ----- | 9+5 | 7+6 | 10+8 |
| 8 | ----- | ----- | ----- | ----- | ----- | ----- | ----- | ----- | 4+2 | 3+3 |
| 9 | ----- | ----- | ----- | ----- | ----- | ----- | ----- | ----- | ----- | 5+2 |

The evaluation of the final conditions of the flip-flop circuits 5 and 6 can be carried out with the aid of the conventional types of logic circuits. For example, one coincidence circuit, which is adapted to connect all of those outputs of the flip-flop circuits which, for the respective character, are supposed to provide the criterion "on" or "off" may be provided. An example of such an arrangement may be seen in FIG. 9. This arrangement is identical to that shown in U.S. Patent No. 2,619,548 issued to A. Lesti. For simplicity, inverting and isolating elements are omitted so that a clear indication of the mode of operation may be provided. The example of FIG. 9 pertains in particular to the identification of digit 0. The outputs of the counting circuit flip-flops 3 and 14 and the time succession flip-flops 3, 4 and 5 (see Table 1) are coupled to rectifiers 14. A negative voltage is applied in multiple to all of the rectifiers 14, on their sides offering low impedance to a negative voltage, and over a dropping resistor 16. The output pulses provided by the flip-flops (1 condition) are inverted (not shown) and are fed over the conductor to the sides of the rectifiers which offer high impedances to negative voltages. If a negative voltage is applied in multiple to all the rectifiers 14 (as it would be in the case of 0 digit, since these flip-flops would be in the 1 state) the voltage appearing at the output would be that applied to resistor 16. This value of negative voltage could then easily be applied to a corresponding relay and the digit 0 could be indicated by a lamp in series with the contacts of this relay and a potential source. If, on the other hand, the digit is not zero, then one of the flip-flops designated in FIG. 9 would not be in the 1 state and the associated rectifier 14 would conduct through resistor 16 making the output voltage less negative and thus insufficient to actuate the relay.

It is appropriate to carry out a centering of the informations which are stored in the two rows of flip-flop circuits, thus reducing the expenditure necessary for the recognizing circuit. To this end the row of photocells together with the coupled flip-flop circuits is sufficient length that characters which are written somewhat higher or lower than normal, can be reliably seized. Accordingly, the informations which are stored in the flip-flops, are contained in a higher or lower portion of the two rows of flip-flops. For the purpose of simplifying the recognizing circuit the informations, after the scanning of the characters, are brought into a defined position, e.g. to the lower end of the two rows of flip-flops. Accordingly, the flip-flops of the two rows must be connected among each other like a shift register.

In FIG. 8 there is shown a circuit arrangement suitable for carrying out an automatic shifting to the lower edge of the rows of flip-flops. The direct-current outputs A1 of all of the photocells 4 are connected with an "AND"-circuit 8. If at least one of the outputs A1 of the photocells was set to "black," and if subsequently to the scanning of the character all outputs A1 are returned to "white," then the "AND"-circuit 8 will produce a pulse controlling the two flip-flops 9 and 10 so that the two connected gates 11 and 12 will be opened or unblocked. Thereupon the generator 13 will effect the shifting of the informations which are stored in the two rows of flip-flops 5 and 6 downwardly, like in a shift register, until the two lowest flip-flops are set to the position "on." This releases signals which, via the two capacitors, return the two flip-flops 9 and 10 to their initial position, so that the two connected gates 11 and 12 will be closed or blocked, thus rendering the generator 13 ineffective.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A device for automatically recognizing characters, comprising a plurality of transducing means for scrutinizing segmental zones of a character and producing pulses therefrom relative to character indicia, scanning means for causing transverse relative motion between said transducing means and the character, a first plurality of bistable devices coupled to said transducing means on a one to one basis and a second plurality of bistable devices each coupled to a plurality of said transducing means, the resultant conditions of said first and second pluralities of bistable devices, subsequent to a character scan, providing the information necessary to unambiguously determine the scanned character.

2. A device for automatically recognizing characters as claimed in claim 1, in which the first plurality of bistable devices comprises flip-flop elements adapted to be triggered from one to the other stable condition by successive pulses of a predetermined level received from the corresponding transducer means, and in which the second plurality of bistable devices are each coupled to two transducing means and comprise flip-flop elements adapted to be triggered to one stable condition by a pulse of predetermined level from one of the transducer means and to a different stable condition by a pulse of predetermined level received from the other transducer means.

3. A device for automatically recognizing characters as claimed in claim 1, in which the transducing means are arranged in an ordered vertical array substantially perpendicular to the transverse relative motion and in which each of the second plurality of bistable devices is coupled to two of the said transducing means, one of which is above the other in the said array.

4. A device for automatically recognizing characters as claimed in claim 3, in which successive transducing means are horizontally staggered.

5. A device for automatically recognizing characters as claimed in claim 2, in which the first plurality of bistable devices are connected together in a first tandem arrangement and the second plurality of bistable devices are connected together in a second tandem arrangement, the device for automatically recognizing characters further comprising means for indicating that a complete character has been scanned, means responsive to said indicating means for causing each bistable device to assume the condition of a predetermined neighbor in each of the said tandem arrangements, the said tandem arrangements thus forming shift registers, and further comprising first and second means for halting the shifting of said respective first and second tandem arrangements when a predetermined condition is achieved in each said arrangement.

6. A device for automatically recognizing characters as claimed in claim 5, in which the means for indicating that a complete character has been scanned, comprises a gate coupled to all of the transducing means and in which the means responsive to said indicating means comprises a blocking gate for each tandem arrangement, a flip-flop device for each tandem arrangement and a generator, said flip-flop devices being coupled to said first mentioned and blocking gates and assuming a condition responsive thereto for unblocking said blocking gates, said blocking gates releasing signals from said generator to one end of each of the tandem arrangements, and in which the means for halting the shifting comprises means coupled to said flip-flop devices for reversing the unblocking conditions thereof, said flip-flop devices being responsive to a predetermined condition in a predetermined one of the bistable devices in each of the said tandem arrangements respectively for blocking the corresponding blocking gate and thereby isolating said generator.

7. A device for automatically recognizing characters, comprising a plurality of transducer means for scrutinizing segmental zones of a character and for producing pulses therefrom relative to character indicia, scanning means for causing transverse relative motion between said transducer means and the character, said transducer means being arranged in an ordered array substantially perpendicular to the said transverse relative motion, amplifying and digitalizing means serially coupled to each of said transducer means, a first plurality of bistable devices individually coupled to said digitalizing means, a second plurality of bi-stable devices, and means coupling each device of said second plurality to at least two of said digitalizing means so that the conditions of said first and second pluralities of bistable devices unambiguously distinguish said characters.

8. A device for automatically recognizing characters as claimed in claim 7, in which the first plurality of bistable devices are connected together in a first tandem arrangement and the second plurality of bistable devices are connected together in a second tandem arrangement, further comprising means for indicating that a complete character has been scanned, means responsive to said indicating means for causing each bistable device to assume the condition of a predetermined neighboring device in each of said tandem arrangements, and means for rendering said last mentioned means inoperative.

9. A device for automatically recognizing characters as claimed in claim 8, in which the means for indicating that a complete character has been scanned, is coupled to one output of each of said digitalizing means, and in which second outputs of said digitalizing means are coupled in parallel to said first plurality of bistable devices and also to said second plurality of bistable devices, and in which third outputs of said digitalizing means are each coupled to one of said second plurality of bistable devices.

10. A device for automatically recognizing characters as claimed in claim 9, in which said second outputs of the digitalizing means include circuits having R-C time constants of a predetermined value and said third outputs of said digitalizing means comprise circuits having R-C time constants of a different predetermined value.

11. A device for automatically recognizing characters comprising a plurality of transducing means adapted to scan segmental zones of a character and to produce output signals representative of said character, a first plurality of means coupled on a one to one basis to said transducing means for counting the number of character line elements in the corresponding scanned zones, a second plurality of means each coupled to a plurality of said transducing means for distinguishing the relative displacements of character line elements in neighboring segmental zones to provide indications of the slopes of said line elements, and means coupled to said first and second pluralities of means for unambiguously determining the scanned character in response to the output conditions of said first and second pluralities subsequent to the scanning of said character.

12. A device for automatically recognizing characters comprising a plurality of transducing means adapted to scan segmental zones of a character and to produce output signals representative of said character, a first plurality of bistable devices coupled on a one to one basis to said plurality of transducing means, a second plurality of bistable devices each coupled to a plurality of said transducing means with a different plurality of said transducing means coupled to each bistable device of said second plurality of devices and means coupled to said first and second pluralities of bistable devices for unambiguously determining the scanned character in response to the output conditions of said bistable devices subsequent to the scanning of said character.

References Cited in the file of this patent

UNITED STATES PATENTS

| | | |
|---|---|---|
| 2,616,983 | Zworykin | Nov. 4, 1952 |
| 2,942,778 | Broido | June 28, 1960 |
| 2,948,818 | Eiichi Goto | Aug. 9, 1960 |

OTHER REFERENCES

"Character Recognition" by Glauberman, Electronics, February 1956, pp. 132 to 136.

"Computers and Automata" by Shannon, Proceedings of I.R.E., October 1953, pp. 1234 to 1241.